May 23, 1961     E. L. LANE     2,985,070

FIELD GLASS HAVING DISPLACEABLE OCULAR LENS

Filed Sept. 23, 1957

INVENTOR
ERIK LENNART LANE
BY
ATTORNEY

United States Patent Office 2,985,070
Patented May 23, 1961

2,985,070

FIELD GLASS HAVING DISPLACEABLE OCULAR LENS

Erik Lennart Lane, Sveavagen 61, Stockholm, Sweden

Filed Sept. 23, 1957, Ser. No. 685,691

1 Claim. (Cl. 88—34)

The present invention relates to a field glass which can magnify the image produced by the objective of the field glass and which provides changed magnification automatically, i.e., solely by displacement of the ocular.

In this field glass the oculars are displaceable in relation to the objective by means of a common operating member. Each of the oculars comprises at least two lens elements, one of which is removable from the path of the light rays of the ocular. The two lens elements are interconnected by a drive member, which, at some phase of the displacement of the lens elements in relation to the objective, causes the removal of one lens element from the path of the light rays. The nature of the invention will be better understood by referring to the following description taken in connection with the accompanying drawing wherein—

Figure 1:
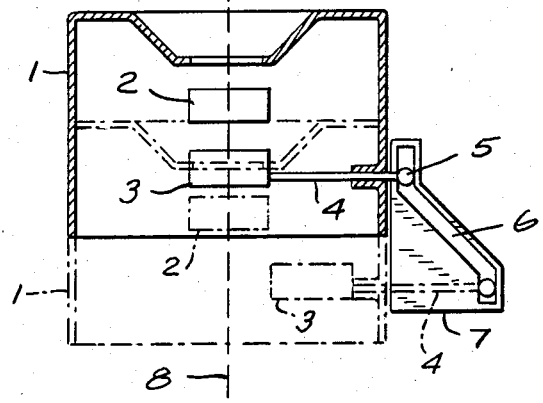

Fig. 1 is a diagrammatic view illustrating one embodiment of the invention; and

Figure 2:
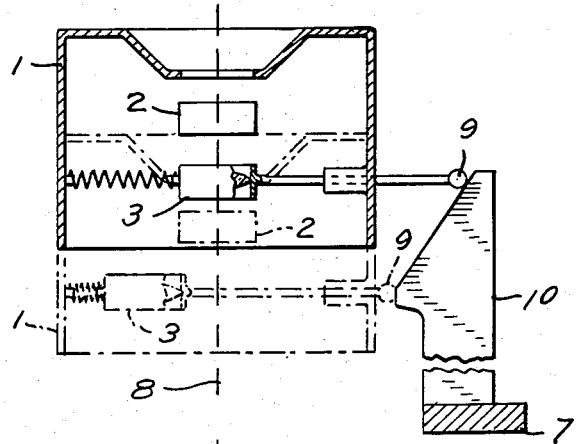
Figure 3:
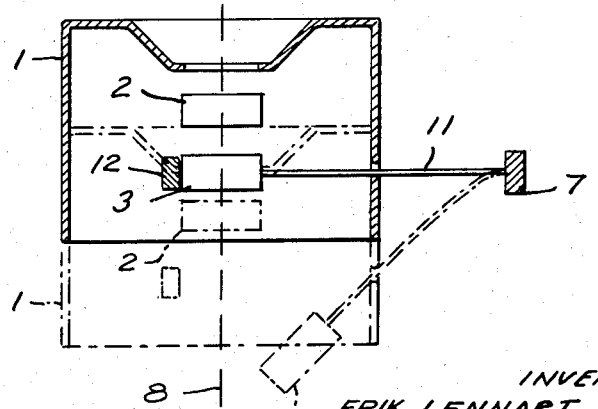

Figs. 2 and 3 are diagrammatic views illustrating further embodiments of the invention. In these embodiments the glass is provided with removable ocular portions which are moved automatically into and out of the path of light rays 8 of the ocular, when the latter is displaced relatively to the objective. The ocular 1 has two lens elements 2 and 3, the latter element 3 of which can be moved into and out of the path of the light rays 8 of the ocular. In Fig. 1 the movement is effected by means of a bracket 4 having a part 5 which moves in groove 6 in a stationary part 7 of the field glass, whereby the lens 3 is retracted from the path of the beam when the ocular 1 is displaced toward the stationary part 7.

The removable lens 3 may also be connected with the stationary part 7 by means of an articulated bracket 9 (Fig. 2) cooperating with a stationary cam 10 by which the bracket 9 and lens are shifted out of the path of beam 8 when the ocular is displaced. Another example is shown in Fig. 3, where the lens portion 3 is connected with the stationary part 7 by means of a resilient or spring means, for example a leaf spring 11, whereby the lens 3 is moved out of the path of the light rays 8 when the ocular is displaced towards the objective of the field glass. The groove 6 and the pin 10 and the resilient device 11 are prefarably so formed that the ocular 1, only at part of its displacement, effects movement of the lens 3. Examples of forms of said groove and pin can be seen from Figs. 1 and 2. Fig. 3 shows a stop 12 which interrupts the movement of the lens 3, even if the tension of the spring 11 tends to remove the lens 3 still more from the stationary part 7.

What is claimed is:

A field glass comprising a housing and an ocular tube slidable in said housing axially along the path of the light rays, first and second lens elements carried by said tube, a bracket carrying said second lens element, said bracket comprising a rod extending transversely through said tube, a bushing carried by said tube and supporting said rod for slidable movement in a direction transverse to the axis of said tube, a fixed cam carried by said housing outside of said tube, and a cam follower disposed on the end of said rod to engage said cam and adapted to retract said second lens element transversely out of the path of the light rays in response to axial movement of said tube relative to said housing.

References Cited in the file of this patent

UNITED STATES PATENTS

| 1,127,720 | Lemaire | Feb. 9, 1915 |

FOREIGN PATENTS

| 16,125 | Great Britain | of 1905 |
| 504,032 | Great Britain | Apr. 18, 1939 |
| 382,478 | Germany | Oct. 3, 1923 |